United States Patent
Fubuki (10) Patent No.: US 10,027,207 B2
(45) Date of Patent: Jul. 17, 2018

(54) SHRINK-FITTING METHOD FOR LAMINATED ROTOR

(71) Applicant: TOYOTA JIDOSHA KABUSHIKI KAISHA, Toyota-shi, Aichi-ken (JP)

(72) Inventor: Shingo Fubuki, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 178 days.

(21) Appl. No.: 15/225,090

(22) Filed: Aug. 1, 2016

(65) Prior Publication Data

US 2017/0047827 A1 Feb. 16, 2017

(30) Foreign Application Priority Data

Aug. 10, 2015 (JP) ................. 2015-158436

(51) Int. Cl.
  *H02K 15/02* (2006.01)
  *H02K 15/10* (2006.01)
  *H02K 1/28* (2006.01)

(52) U.S. Cl.
  CPC ............. *H02K 15/028* (2013.01); *H02K 1/28* (2013.01)

(58) Field of Classification Search
  CPC .............................. H02K 1/28; H02K 15/028
  See application file for complete search history.

(56) References Cited

U.S. PATENT DOCUMENTS

| 3,694,906 | A * | 10/1972 | Rank .................. | H02K 1/28 29/447 |
| 9,621,002 | B2 * | 4/2017 | Schreiber ............... | H02K 1/276 |
| 9,787,164 | B2 * | 10/2017 | Buttner ................. | H02K 9/197 |
| 9,853,515 | B2 * | 12/2017 | Effler ..................... | H02K 3/50 |
| 2013/0127283 | A1 | 5/2013 | Matsumoto et al. | |

(Continued)

FOREIGN PATENT DOCUMENTS

| CN | 102934329 A | 2/2013 |
| CN | 104917314 A | 9/2015 |
| JP | 2002-152999 A | 5/2002 |

(Continued)

OTHER PUBLICATIONS

May 28, 2018 Office Action issued in Chinese Patent Application No. 201610645482.5.

*Primary Examiner* — Paul D Kim
(74) *Attorney, Agent, or Firm* — Oliff PLC (57) ABSTRACT

A shrink-fitting method for a laminated rotor includes: disposing, coaxially with a laminated rotor core, an annular ring having a through-hole, at an axial end of the laminated rotor core including laminated annular steel sheets and having a through-hole extending in its axial direction; and inserting a rotor shaft into the through-holes of the ring and the laminated rotor core after heating them. A ring attachment jig having a circular internal space, where the ring is disposed, has projections projecting from an axial end surface thereof in the axial direction and arranged along a circumferential direction of the circular internal space. The center of the ring is aligned with the center of the laminated rotor core, by fitting the projections in attachment holes axially extending in the laminated rotor core, and fitting the ring to an inner peripheral surface of the ring attachment jig, which defines the circular internal space.

5 Claims, 6 Drawing Sheets

(56) References Cited

U.S. PATENT DOCUMENTS

2014/0285058 A1\* 9/2014 Thumm ............... H02K 17/165
310/211

FOREIGN PATENT DOCUMENTS

| JP | 2008-141892 | A | 6/2008 |
| JP | 05-070149 | B2 | 11/2012 |
| JP | 05-070149 | U | 11/2012 |
| JP | 2013-153559 | A | 8/2013 |
| JP | 2014-036471 | A | 2/2014 |
| JP | 2015-042124 | A | 3/2015 |
| WO | 2014/129086 | A1 | 8/2014 |

\* cited by examiner

BUCKLING   BUCKLING

SHRINK-FITTING METHOD FOR LAMINATED ROTOR

INCORPORATION BY REFERENCE

The disclosure of Japanese Patent Application No. 2015-158436 filed on Aug. 10, 2015 including the specification, drawings and abstract is incorporated herein by reference in its entirety.

BACKGROUND

1. Technical Field

The disclosure relates to a shrink-fitting method for a laminated rotor, the shrink-fitting method being a method for fitting a laminated rotor core onto a rotor shaft by shrink-fitting.

2. Description of Related Art

According to a known shrink-fitting method for a laminated rotor, a laminated rotor core is heated, and then a rotor shaft is inserted into the laminated rotor core. The laminated rotor core is made of a plurality of laminated annular steel sheets, and the laminated rotor core has a through-hole that passes through the laminated rotor core in its axial direction (see, for example, Japanese Utility Model Application Publication No. 05-070149 (JP 05-070149 U)).

SUMMARY

In the shrink-fitting method for a laminated rotor, when the rotor shaft is inserted into the through-hole of the laminated rotor core, an outer peripheral surface of the rotor shaft may come in contact with and rub against an inner peripheral surface of the laminated rotor core, the inner peripheral surface of the laminated rotor core defining the through-hole of the laminated rotor core. As a result, a contact portion of the laminated rotor core may bend (deform) in the axial direction. The contact portion faces the through-hole and comes into contact with the rotor shaft. In order to prevent this from occurring, an annular ring having a through-hole may be disposed at an axial end of the laminated rotor core. However, the laminated rotor core and the ring may differ in outer diameter from each other, and therefore positioning for aligning the center of the ring with the center (central axis) of the laminated rotor core is difficult. If a misalignment occurs between the center position of the laminated rotor core and the center position of the ring, the rotor shaft cannot be inserted into the through-hole of the laminated rotor core and the through-hole of the ring, or poor insertion of the rotor shaft, such as generation of scratches on an inner peripheral surface of the ring, may occur. The disclosure provides a shrink-fitting method for a laminated rotor, the shrink-fitting method making it possible to fasten a laminated rotor core and a rotor shaft to each other while reducing the occurrence of a misalignment of the center of a ring with respect to the center of the laminated rotor core during insertion of the rotor shaft into the laminated rotor core, by attaching a simply-configured jig to an end of the laminated rotor core.

A first aspect of the disclosure relates to a shrink-fitting method for a laminated rotor. The shrink-fitting method includes: disposing a ring attachment jig provided with a plurality of projections, at an axial end of a laminated rotor core having a plurality of attachment holes, by fitting the projections of the ring attachment jig in the attachment holes of the laminated rotor core, the laminated rotor core being made of a plurality of laminated annular steel sheets, the laminated rotor core having a through-hole passing through the laminated rotor core in an axial direction of the laminated rotor core, the projections of the ring attachment jig projecting from an axial end surface of the ring attachment jig, the projections of the ring attachment jig being arranged along a circumferential direction of a circular internal space of the ring attachment jig, and the attachment holes being provided in an axial end portion of the laminated rotor core; disposing a ring having an annular shape and having a through-hole such that the ring is coaxial with the laminated rotor core, by fitting the ring to an inner peripheral surface of the ring attachment jig, the inner peripheral surface of the ring attachment jig defining the circular internal space of the ring attachment jig; and inserting a rotor shaft into the through-hole of the laminated rotor core and the through-hole of the ring, after the ring and the laminated rotor core are heated. The shrink-fitting method according to the first aspect may further include applying an axial force to the ring such that the ring is pressed against the laminated rotor core, after the ring and the laminated rotor core are heated and the rotor shaft is inserted into the through-hole of the ring and the through-hole of the laminated rotor core.

According to the above aspect of the disclosure, it is possible to provide the shrink-fitting method for a laminated rotor, the shrink-fitting method making it possible to fasten the laminated rotor core and the rotor shaft to each other while reducing the occurrence of a misalignment of the center of the ring with respect to the center of the laminated rotor core during insertion of the rotor shaft into the laminated rotor core, by attaching the simply-configured jig to an end of the laminated rotor core.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, example embodiments of the disclosure will be described with reference to the accompanying drawings.

Figure 1A:
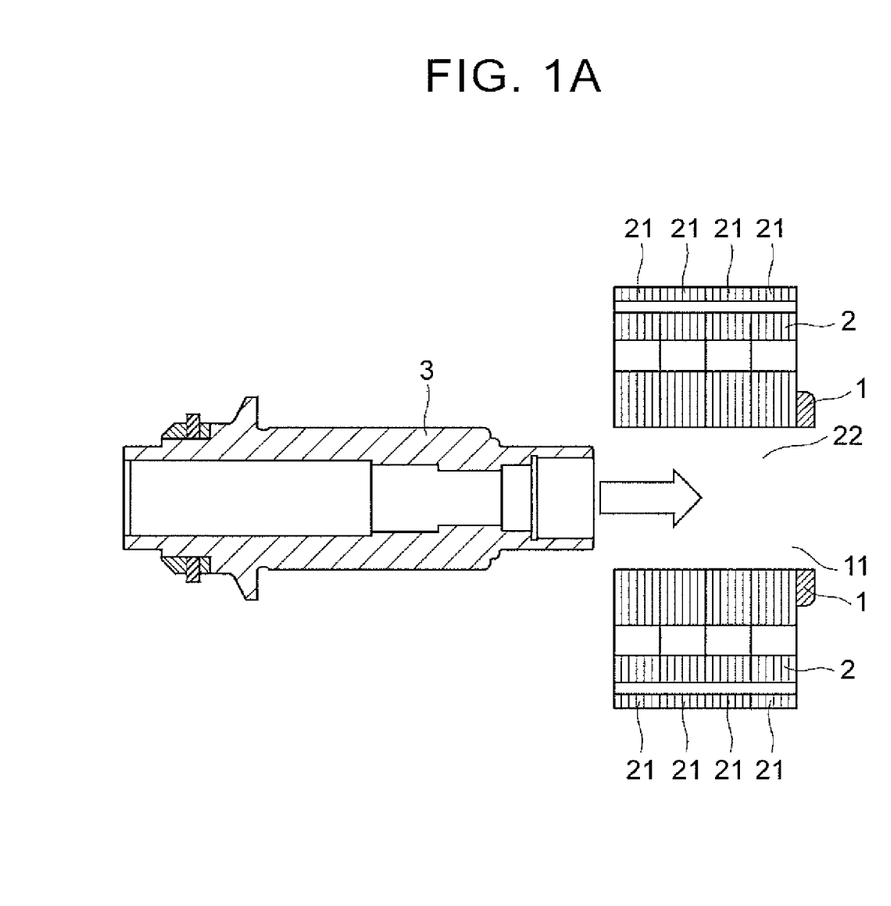
FIG. 1A is a view illustrating a state where a rotor shaft has not been inserted into a through-hole of a laminated rotor core and a through-hole of a ring.
Figure 1B:
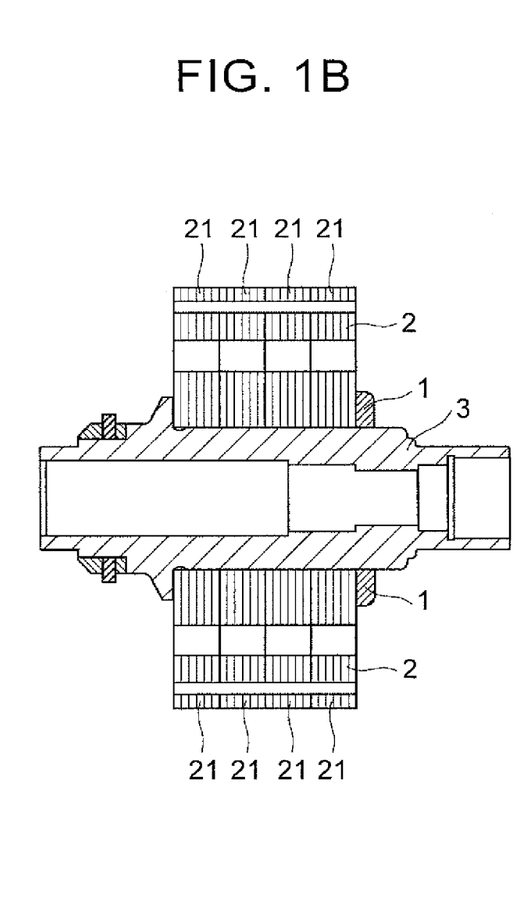
FIG. 1B is a view illustrating a state where the rotor shaft has been inserted in the through-hole of the laminated rotor core and the through-hole of the ring.

In a shrink-fitting method for a laminated rotor according to an embodiment of the disclosure, a ring 1 having an annular shape and having a through-hole 11 is disposed at an axial end of a laminated rotor core 2 so as to be coaxial with the laminated rotor core 2 (see FIG. 1). The laminated rotor core 2 is made of a plurality of laminated annular steel sheets 21, and has a through-hole 22 that passes through the laminated rotor core 2 in its axial direction (see FIG. 1A and FIG. 1B). Then, the ring 1 and the laminated rotor core 2 are heated, and a rotor shaft 3 is inserted into the through-hole 22 of the laminated rotor core 2 and the through-hole 11 of the ring 1. The ring 1, the laminated rotor core 2, and the rotor shaft 3 are integrated together to constitute a rotor of a motor.

The laminated rotor core 2 is produced, for example, by laminating a plurality of electromagnetic steel sheets having the same shape, and then integrating the laminated electromagnetic steel sheets together by, for example, squeezing or welding. The rotor shaft 3 is made of a steel material containing, for example, chromium and carbon. The rotor shaft 3 has a hollow cylindrical shape (pipe shape).

The diameter of each of the through-hole 11 of the ring 1 and the through-hole 22 of the laminated rotor core 2 (i.e., the inner diameter of each of the ring 1 and the laminated rotor core 2) is set to be slightly smaller than the outer diameter of the rotor shaft 3. Therefore, the diameter of each of the through-hole 11 of the ring 1 and the through-hole 22 of the laminated rotor core 2 is increased by heating the ring 1 and the laminated rotor core 2, and then the rotor shaft 3 is inserted into the laminated rotor core 2 and the ring 1. After that, the ring 1 and the laminated rotor core 2 are cooled. When the temperatures of the ring 1 and the laminated rotor core 2 are lowered, the diameter of each of the through-hole 11 of the ring 1 and the through-hole 22 of the laminated rotor core 2 is reduced. As a result, an inner peripheral surface of the ring 1, which defines the through-hole 11, and an inner peripheral surface of the laminated rotor core 2, which defines the through-hole 22, come in contact with an outer peripheral surface of the rotor shaft 3, and tighten the rotor shaft 3.

In this way, the ring 1 and the laminated rotor core 2 are fixed to the rotor shaft 3 by shrink-fitting. In the present embodiment, the ring 1 and the laminated rotor core 2 are simultaneously heated. This allows the shared use of a heater, thereby leading to reduction in heating cost. After heating, the ring 1 and the laminated rotor core 2 are conveyed in an integrated manner, and the rotor shaft 3 is inserted into the laminated rotor core 2 and the ring 1. This facilitates the conveyance, thereby leading to reduction in conveyance cost.

The ring 1 and the laminated rotor core 2 are heated, for example, by induction heating that is a process in which a high-frequency current is supplied to a high-frequency induction coil. However, heating of the ring 1 and the laminated rotor core 2 is not limited to induction heating, and any heating methods may be employed to heat the ring 1 and the laminated rotor core 2. For example, the ring 1 and the laminated rotor core 2 may be heated in a furnace.

When the rotor shaft 3 is inserted into the through-hole 22 of the laminated rotor core 2, the outer peripheral surface of the rotor shaft 3 comes in contact with and rubs against the inner peripheral surface of the laminated rotor core 2, which defines the through-hole 22. As a result, a contact portion of the laminated rotor core 2 receives an axial force. The contact portion of the laminated rotor core 2 is a portion that faces the through-hole 22 and that comes into contact with the rotor shaft 3.

Figure 2A:
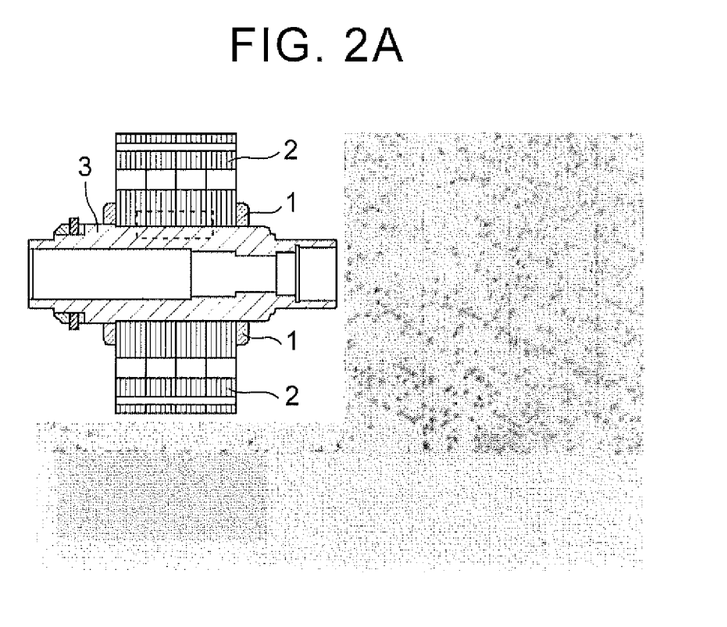
FIG. 2A is a view illustrating a contact portion of the laminated rotor core, which faces the through-hole and which comes into contact with the rotor shaft.
Figure 2B:
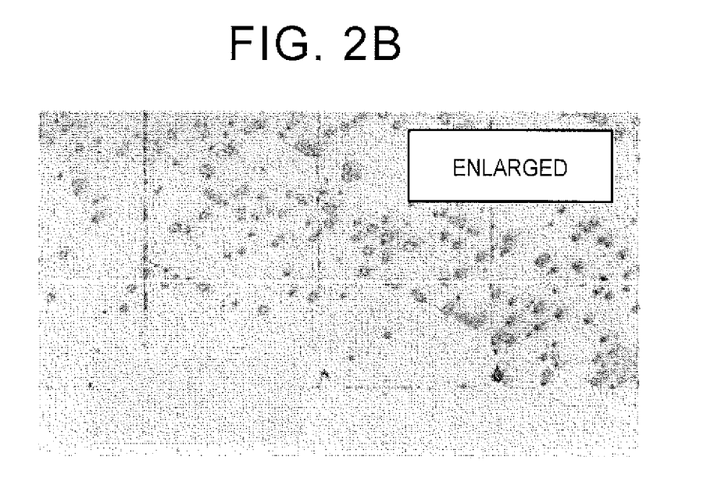
FIG. 2B is a view illustrating an enlarged view of the contact portion illustrated in FIG. 2A.
Figure 6A:
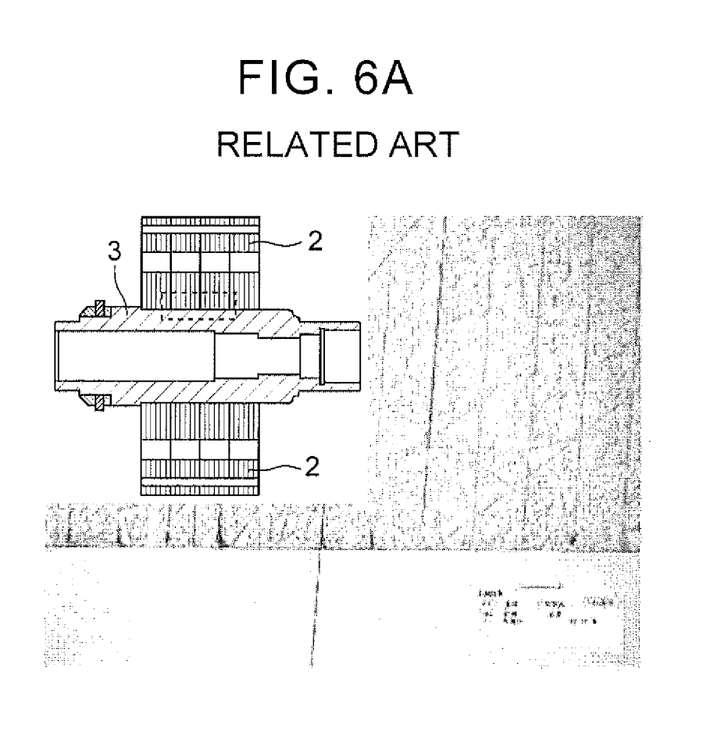
FIG. 6A is a view illustrating buckling of a contact portion of a laminated rotor core, which faces a through-hole and which comes into contact with a rotor shaft in related art.
Figure 6B:
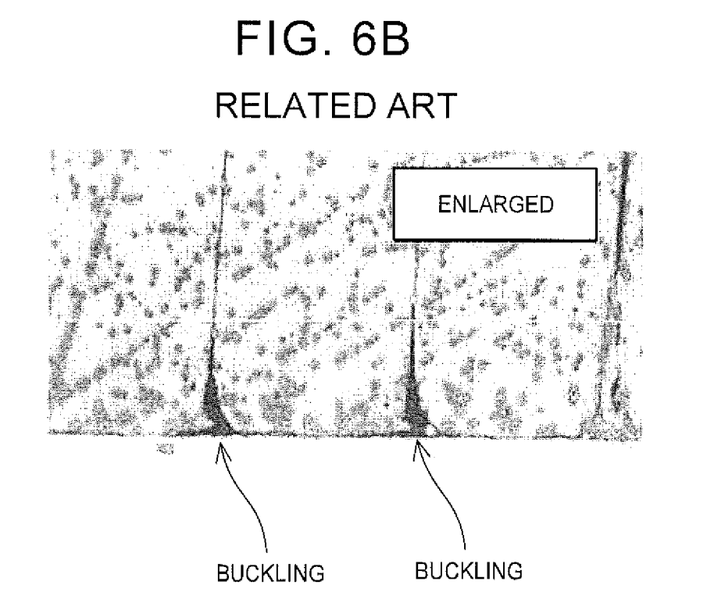
FIG. 6B is a view illustrating an enlarged view of the contact portion illustrated in FIG. 6A.

In related art, such an axial force causes buckling, that is, such an axial force causes a contact portion of a laminated rotor core to bend (deform) in its axial direction (see FIG. 6A and FIG. 6B). The contact portion of the laminated rotor core is a portion that faces a through-hole and that comes into contact with a rotor shaft. However, in the present embodiment, the ring 1 is disposed at the axial end of the laminated rotor core 2, as described above. Thus, when the laminated rotor core 2 and the ring 1 are fixed to the rotor shaft 3, an axial force acts on the laminated rotor core 2. This is because the ring 1 having an outer diameter smaller than that of each of the laminated steel sheets 21 of the laminated rotor core 2 is less likely to deform in the axial direction than the laminated steel sheets 21. Thus, it is possible to prevent the occurrence of buckling in which the contact portion of the laminated rotor core 2 bends (deforms) in the axial direction. As a result, it is possible to prevent reduction in a fastening force with which the inner peripheral surface of the laminated rotor core 2, which defines the through-hole 22, and the rotor shaft 3 are fastened to each other (see FIG. 2A and FIG. 2B).

Figure 3:
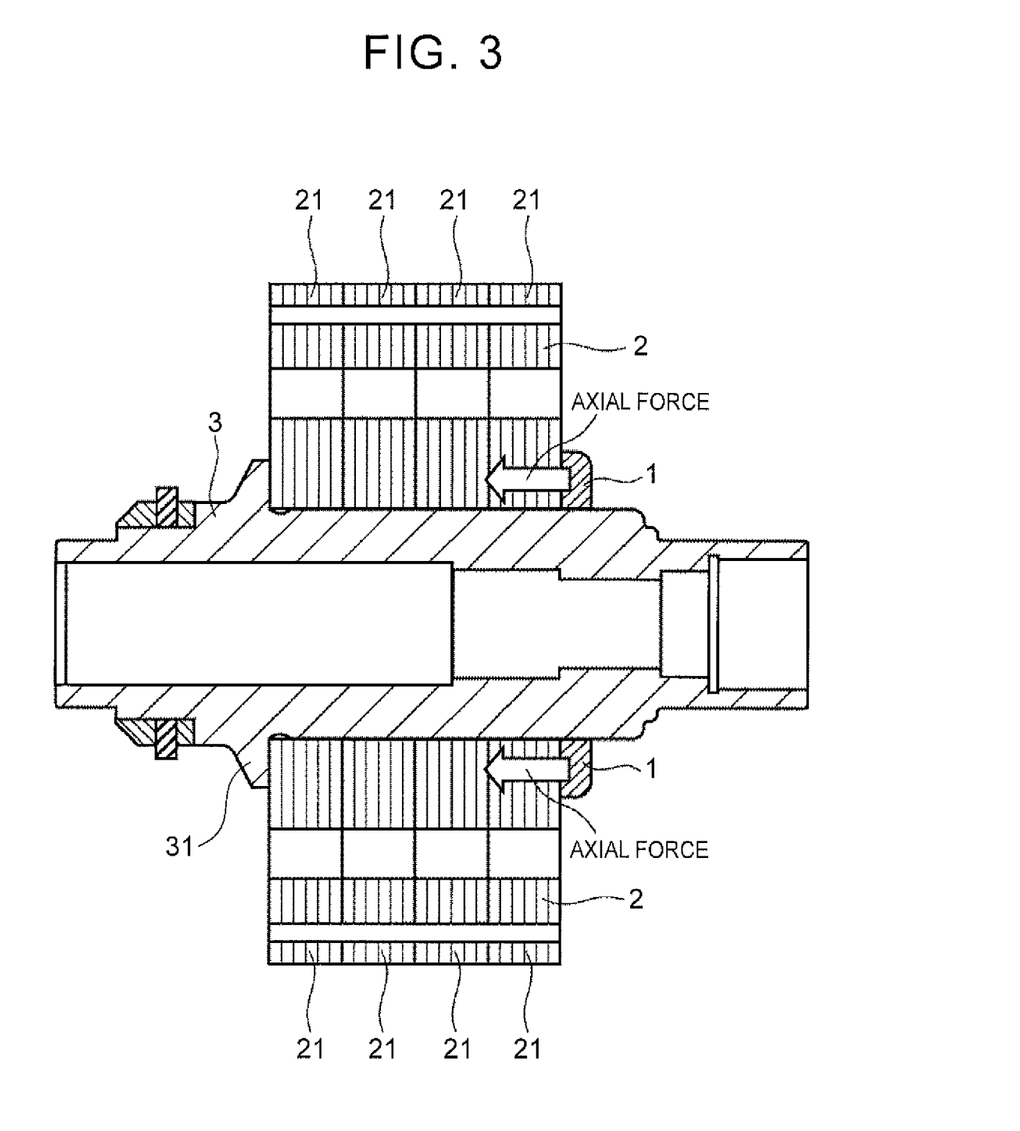
FIG. 3 is a view illustrating a state where an axial force is applied such that the ring is pressed against the laminated rotor core in its axial direction.

Further, the rotor shaft 3 is provided with a flange 31 that projects from the outer peripheral surface of the rotor shaft 3. The flange 31 comes in contact with an axial end of the laminated rotor core 2, thereby supporting the laminated rotor core 2. After the ring 1 and the laminated rotor core 2 are heated and the rotor shaft 3 is inserted into the through-hole 22 of the laminated rotor core 2 and the through-hole 11 of the ring 1, an axial force may be applied such that the ring 1 is pressed against the laminated rotor core 2 in the axial direction (see FIG. 3). Then, the ring 1 and the laminated rotor core 2 may be cooled to be fixed to the rotor shaft 3. This makes it possible to fasten the laminated rotor core 2 and the rotor shaft 3 to each other, with the clearances between the steel sheets 21 of the laminated rotor core 2 reduced. In this case, even when a fastening force with which the inner peripheral surface of the laminated rotor core 2, which defines the through-hole 22, and the rotor shaft 3 are fastened to each other is reduced during high-speed rotation, the laminated rotor core 2 and the rotor shaft 3 are kept in the fastened state by a fastening force (axial force component) in the axial direction of the laminated rotor core 2.

When a laminated rotor core and a ring differ in outer diameter from each other, positioning for aligning the center of the ring with the center (central axis) of the laminated rotor core is difficult. If a misalignment occurs between the center position of the laminated rotor core and the center position of the ring, the rotor shaft cannot be inserted into the through-hole of the laminated rotor core and the through-hole of the ring, or poor insertion of the rotor shaft, such as generation of scratches on an inner peripheral surface of the ring, may occur.

In contrast to this, in the shrink-fitting method for a laminated rotor according to the present embodiment, the ring 1 having an annular shape and having the through-hole 11 is disposed at the axial end of the laminated rotor core 2 so as to be coaxial with the laminated rotor core 2. A ring attachment jig 4 has a circular internal space. The ring 1 is fitted to an inner peripheral surface of the ring attachment jig 4. The inner peripheral surface of the ring attachment jig 4 defines the circular internal space. The ring attachment jig 4 is provided with a plurality of projections 41 projecting from an axial end surface of the ring attachment jig 4. The projections 41 are arranged along the circumferential direction of circular internal space (see FIG. 4). The laminated rotor core 2 has a plurality of attachment holes 23 extending in the axial direction of the laminated rotor core 2. The ring 1 is fitted to the inner peripheral surface of the ring attachment jig 4, which defines the circular internal space, and the projections 41 of the ring attachment jig 4 are fitted in the attachment holes 23 of the laminated rotor core 2, so that positioning for aligning the center of the ring 1 with the center of the laminated rotor core 2 is performed. It is thus possible to reduce the occurrence of a misalignment of the center of the ring 1 with respect to the center of the laminated rotor core 2 during insertion of the rotor shaft 3 into the laminated rotor core 2, by attaching the simply-configured ring attachment jig 4 to the end of the laminated rotor core 2. Further, it is possible to fasten the laminated rotor core 2 and the rotor shaft 3 to each other, with the clearances between the steel sheets 21 of the laminated rotor core 2 reduced.

Figure 4:
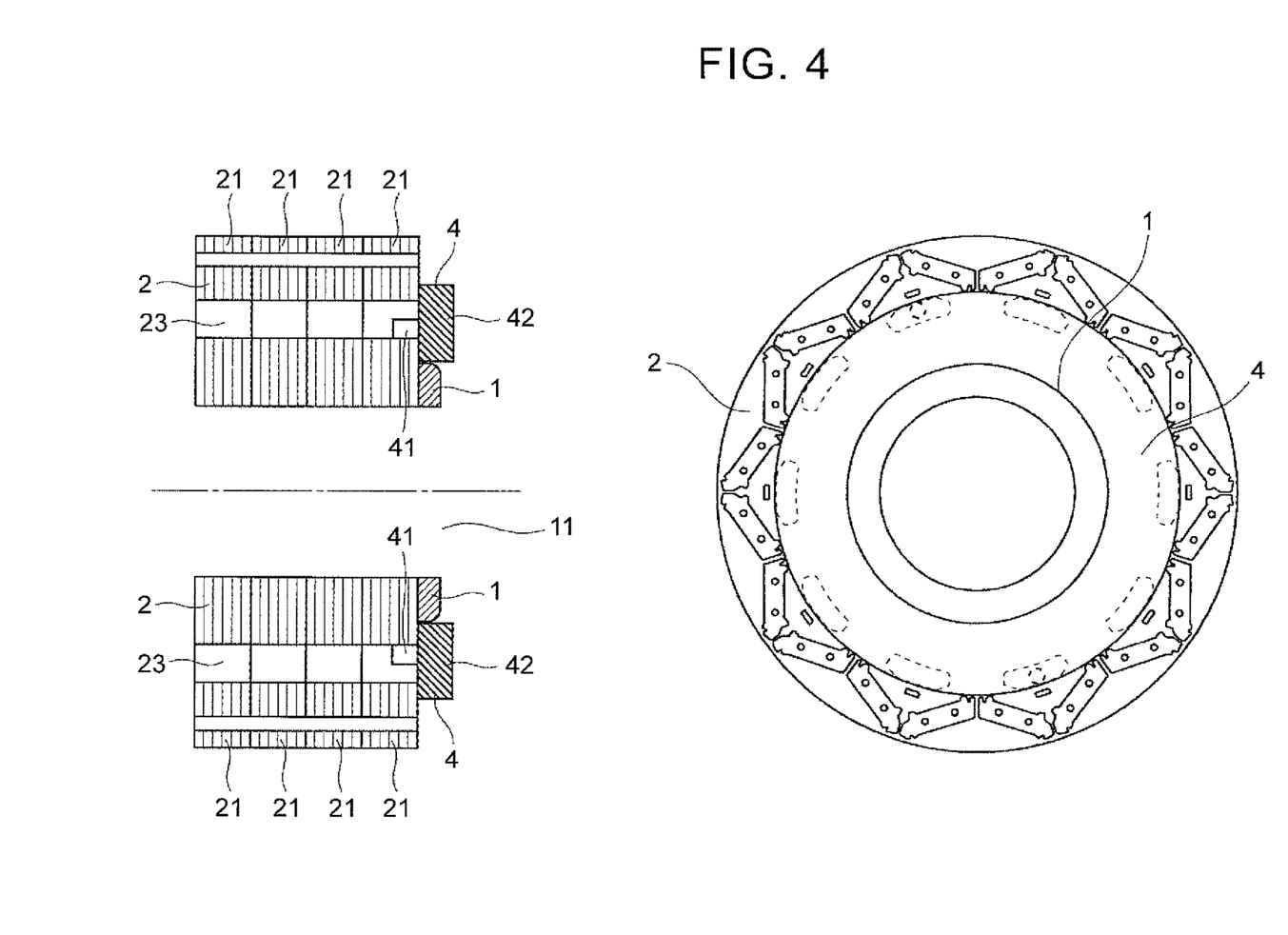
FIG. 4 illustrates a state where projections of a ring attachment jig are fitted in attachment holes of the laminated rotor core.

The ring attachment jig 4 has a ring portion 42 having an annular shape, and a plurality of the projections 41 projecting from the axial end surface of the ring attachment jig 4 and arranged along the circumferential direction of the ring portion 42. The ring attachment jig 4 has an annular shape. However, the shape of the ring attachment jig 4 is not limited an annular shape. The ring attachment jig 4 may have, for example, a rectangular parallelepiped shape. For example, three projections 41 are provided on an end surface of the ring portion 42, at equal intervals along the circumferential direction of the ring portion 42. However, the number of the projections 41 is not limited three. The number of the projections 41 provided on the ring portion 42 may be four or more. Any number of projections 41 may be provided. The accuracy of positioning is expected to be increased by increasing the number of the projections 41.

The attachment holes (recesses or through-holes) 23 of the laminated rotor core 2 are provided so as to correspond to the projections 41 of the ring attachment jig 4. The attachment holes 23 are provided in an axial end portion of the laminated rotor core 2. Holes formed in advance in a process of producing the laminated rotor core 2 may be used as the attachment holes 23 of the laminated rotor core 2. Alternatively, the attachment holes 23 may be formed so as to correspond to the projections 41 of the ring attachment jig 4.

Positioning for aligning the center of the ring attachment jig 4 with the center of the laminated rotor core 2 is performed by fitting the projections 41 of the ring attachment jig 4 in the corresponding attachment holes 23 of the laminated rotor core 2. Furthermore, positioning for aligning the center of the ring 1 with the center of the ring attachment jig 4 is performed by fitting the ring 1 to the inner peripheral surface of the ring portion 42 of the ring attachment jig 4. In this way, positioning for aligning the center of the ring 1 with the center of the laminated rotor core 2 is performed. As described above, positioning for aligning the center of the ring 1 with the center of the laminated rotor core 2 is performed highly accurately by using the simply-configured ring attachment jig 4 having the projections 41 and the ring portion 42. Thus, the rotor shaft 3 can smoothly be inserted into the through-hole 22 of the laminated rotor core 2 and the through-hole 11 of the ring 1 because the center of the laminated rotor core 2 and the center of the ring 1 are highly accurately aligned with each other. In this way, it is possible to reduce the occurrence of a failure of the insertion of the rotor shaft into the through-hole of the laminated rotor core and the through-hole of the ring, or the occurrence of poor insertion of the rotor shaft, such as generation of scratches on the inner peripheral surface of the ring. Such a failure of insertion of the rotor shaft or poor insertion of the rotor shaft may occur if a misalignment occurs between the center position of the laminated rotor core and the center position of the ring.

Next, a flow of the shrink-fitting method for a laminated rotor according to the present embodiment will be described. First, the projections 41 of the ring attachment jig 4 are fitted in the corresponding attachment holes 23 of the laminated rotor core 2. In this way, positioning for aligning the center of the ring attachment jig 4 with the center of the laminated rotor core 2 is performed. Next, the ring 1 is fitted to the inner peripheral surface of the ring portion 42 of the ring attachment jig 4. In this way, positioning for aligning the center of the ring 1 with the center of the ring attachment jig 4 is performed.

After positioning for aligning the centers of the ring attachment jig 4, the ring 1, and the laminated rotor core 2 with each other is performed, the ring attachment jig 4, the ring 1, and the laminated rotor core 2 are heated by using, for example, the high-frequency induction coil. Note that the ring attachment jig 4 may be removed and only the ring 1 and the laminated rotor core 2, of which the centers are aligned with each other, may be heated. Then, the rotor shaft 3 is inserted into the through-holes 22, 11 of the laminated rotor core 2 and the ring 1 that are integrated together.

As described so far, in the shrink-fitting method for a laminated rotor according to the present embodiment, positioning for aligning the center of the ring 1 with the center of the laminated rotor core 2 is performed, by fitting the ring 1 to the inner peripheral surface of the ring attachment jig 4 and fitting the projections 41 of the ring attachment jig 4 in the corresponding attachment holes 23 extending in the axial direction of the laminated rotor core 2. It is thus possible to reduce the occurrence of a misalignment of the center of the ring 1 with respect to the center of the laminated rotor core 2 during insertion of the rotor shaft 3 into the laminated rotor core 2, by attaching the simply-configured ring attachment jig 4 to the end of the laminated rotor core 2. Further, it is possible to fasten the laminated rotor core 2 and the rotor shaft 3 to each other, with the clearances between the steel sheets 21 of the laminated rotor core 2 reduced.

Figure 5:
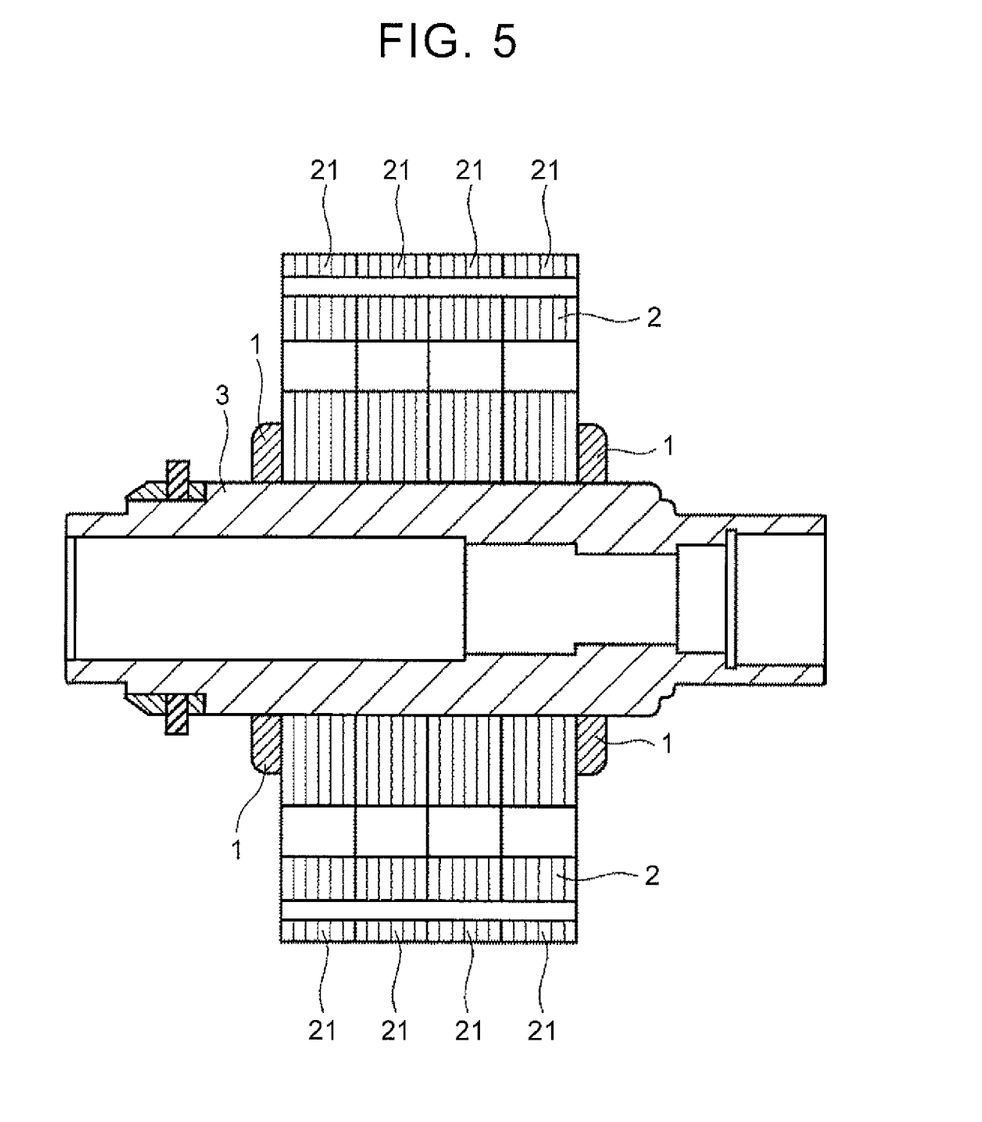
FIG. 5 is a view illustrating a state where rings are disposed at respective axial ends of the laminated rotor core.

The disclosure is not limited to the foregoing embodiment, and various modifications may be made to the foregoing embodiment within the scope of the disclosure. The foregoing embodiment may be modified such that the ring 1 is disposed at each of both axial ends of the laminated rotor core 2 (see FIG. 5). A first ring attachment jig and a second ring attachment jig are attached to the respective axial ends of the laminated rotor core 2 to perform positioning. Then, the rings 1 (a first ring, a second ring) are respectively attached to the first ring attachment jig and the second ring attachment jig disposed at the respective axial ends of the laminated rotor core 2 to perform positioning. The laminated rotor core 2 and the rings 1 disposed at the respective axial ends of the laminated rotor core 2 are heated by using, for example, the high-frequency induction coil. Then, the rotor shaft 3 is inserted into the through-holes 11 of the rings 1 disposed at the respective axial ends of the laminated rotor core 2 and the through-hole 22 of the laminated rotor core 2.

What is claimed is:

1. A shrink-fitting method for a laminated rotor, the shrink-fitting method comprising:
   disposing a ring attachment jig provided with a plurality of projections, at an axial end of a laminated rotor core having a plurality of attachment holes, by fitting the projections of the ring attachment jig in the attachment holes of the laminated rotor core, the laminated rotor core being made of a plurality of laminated annular steel sheets, the laminated rotor core having a through-hole passing through the laminated rotor core in an axial direction of the laminated rotor core, the projections of the ring attachment jig projecting from an axial end surface of the ring attachment jig, the projections of the ring attachment jig being arranged along a circumferential direction of a circular internal space of the ring attachment jig, and the attachment holes being provided in an axial end portion of the laminated rotor core;

disposing a ring having an annular shape and having a through-hole such that the ring is coaxial with the laminated rotor core, by fitting the ring to an inner peripheral surface of the ring attachment jig,
the inner peripheral surface of the ring attachment jig defining the circular internal space of the ring attachment jig; and inserting a rotor shaft into the through-hole of the laminated rotor core and the through-hole of the ring, after the ring and the laminated rotor core are heated.

2. The shrink-fitting method according to claim 1, further comprising
applying an axial force to the ring such that the ring is pressed against the laminated rotor core, after the ring and the laminated rotor core are heated and the rotor shaft is inserted into the through-hole of the ring and the through-hole of the laminated rotor core.

3. The shrink-fitting method according to claim 1, wherein
an outer diameter of the ring is smaller than an outer diameter of the laminated rotor core.

4. The shrink-fitting method according to claim 1, wherein
the rotor shaft is inserted into the laminated rotor core from an opposite side of the laminated rotor core from the axial end at which the ring is disposed, and
the laminated rotor core is held between the ring and a flange projecting from an outer peripheral surface of the rotor shaft.

5. A shrink-fitting method for a laminated rotor, the shrink-fitting method comprising:
disposing a first ring attachment jig provided with a plurality of first projections, at a first axial end of a laminated rotor core having a plurality of first attachment holes provided in a first axial end portion of the laminated rotor core, by fitting the first projections of the first ring attachment jig in the first attachment holes,
the laminated rotor core being made of a plurality of laminated annular steel sheets, the laminated rotor core having a through-hole passing through the laminated rotor core in an axial direction of the laminated rotor core, the first projections of the first ring attachment jig projecting from an axial end surface of the first ring attachment jig, and the first projections of the first ring attachment jig being arranged along a circumferential direction of a circular internal space of the first ring attachment jig;

disposing a second ring attachment jig provided with a plurality of second projections, at a second axial end of the laminated rotor core having a plurality of second attachment holes provided in a second axial end portion that is on an opposite side of the laminated rotor core from the first axial end portion, by fitting the second projections of the second ring attachment jig in the second attachment holes,
the second projections of the second ring attachment jig projecting from an axial end surface of the second ring attachment jig, and the second projections of the second ring attachment jig being arranged along a circumferential direction of a circular internal space of the second ring attachment jig;

disposing a first ring having an annular shape and having a through-hole such that the first ring is coaxial with the laminated rotor core, by fitting the first ring to an inner peripheral surface of the first ring attachment jig,
the inner peripheral surface of the first ring attachment jig defining the circular internal space of the first ring attachment jig;

disposing a second ring having an annular shape and having a through-hole such that the second ring is coaxial with the laminated rotor core, by fitting the second ring to an inner peripheral surface of the second ring attachment jig,
the inner peripheral surface of the second ring attachment jig defining the circular internal space of the second ring attachment jig; and inserting a rotor shaft into the through-hole of the first ring, the through-hole of the second ring, and the through-hole of the laminated rotor core, after the first ring, the second ring, and the laminated rotor core are heated.

* * * * *